United States Patent
Guivarc'h

(12) 
(10) Patent No.: US 6,508,493 B1
(45) Date of Patent: Jan. 21, 2003

(54) MEANS FOR CONNECTING A PIPE TO A TUBULAR BODY

(75) Inventor: Olivier Guivarc'h, Rennes (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 09/666,601

(22) Filed: Sep. 20, 2000

(30) Foreign Application Priority Data

Sep. 20, 1999 (FR) .............................................. 99 11738

(51) Int. Cl.⁷ ................................................. F16L 17/00
(52) U.S. Cl. ........................ 285/354; 285/387; 285/389; 285/388
(58) Field of Search ................................. 285/354, 388, 285/389, 387, 414

(56) References Cited

U.S. PATENT DOCUMENTS

| | | |
|---|---|---|
| 1,675,808 A | 7/1928 | Kliss |
| 1,703,696 A | 2/1929 | Stratford |
| 2,758,852 A * | 8/1956 | Newell .......................... 285/414 |
| 5,120,092 A * | 6/1992 | Gorog et al. .................. 285/15 |
| 5,348,351 A | 9/1994 | LaFleur et al. |

FOREIGN PATENT DOCUMENTS

| | | |
|---|---|---|
| EP | A1-0545469 | 6/1993 |
| FR | 1334545 | 12/1963 |

* cited by examiner

*Primary Examiner*—Lynne H. Browne
*Assistant Examiner*—Aaron Dunwoody
(74) *Attorney, Agent, or Firm*—Birch, Stewart, Kolasch & Birch, LLP

(57) ABSTRACT

The invention provides means for connecting a pipe to a tubular body having an end arranged to receive an end of the pipe. The connection means comprise a sleeve subdivided into first and second portions in axial succession that are provided with means for connecting said portions in leak-proof and releasable manner respectively to the end of the tubular body and to the pipe. The means also comprise a removable abutment ring provided with means for locking it axially on the pipe set back from the end thereof to constitute an abutment shoulder on engagement of the pipe in the tubular body and an axial abutment shoulder between the second portion of the sleeve and the pipe.

7 Claims, 3 Drawing Sheets

FIG_1

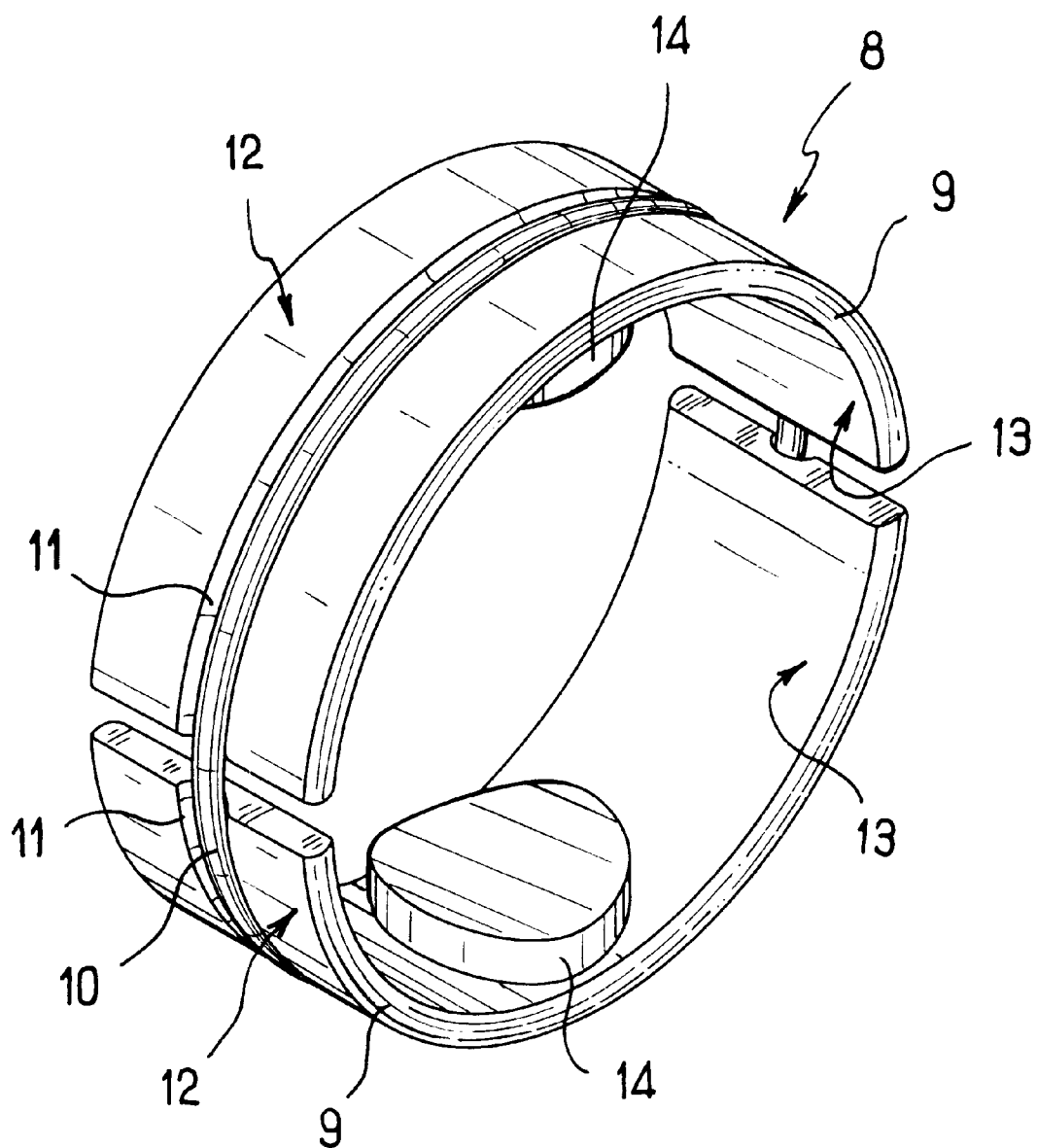
FIG_3

MEANS FOR CONNECTING A PIPE TO A TUBULAR BODY

The present invention relates to means for connecting a pipe to a tubular body. Such connection means are intended, for example, for use in pressurized fluid circuits to interconnect two circuit elements, such as pipes, the tubular body possibly being a coupling between two pipes or an endpiece for coupling a pipe to a functional member to which it is secured.

BACKGROUND OF THE INVENTION

Known devices for coupling together two pipes comprise a union made up of a tubular body having two ends each serving to receive a respective one of the pipe ends that is to be inserted into the union. The coupling device also comprises two sleeves screwed onto respective ends of the tubular body so that each deforms a respective claw washer between an internal shoulder of the sleeve and the end of the tubular body, each claw washer being deformed between a rest state in which it is conical and has an inside diameter greater than the outside diameter of its pipe, and a deformed state in which it is flattened and has an inside diameter smaller than the outside diameter of its pipe so as to bite into the outer surface thereof. The pipes are generally axially positioned in the tubular body by means of annular shoulders formed in the tubular body so as to constitute abutments against further penetration of the pipes into the union. When two pipes of a circuit are connected to each other or to other elements of the circuit by such coupling devices, removal of one of the pipes, e.g. for replacement purposes, makes it necessary, once the sleeves have been withdrawn, to be able to move the two coupling devices apart in order to extract the ends of the pipes from the tubular bodies of said devices. Such disassembly is difficult to perform in a circuit that is relatively complex and in which certain elements can also be fixed to supports.

OBJECTS AND SUMMARY OF THE INVENTION

The invention proposes connection means of a novel type providing a simple alternative to existing means and making it possible, when installed in a circuit, to disengage laterally from an element connected to the circuit.

To this end, the invention provides connection means for connecting a pipe to a tubular body having an end arranged to receive one end of the pipe, the connection means comprising a sleeve subdivided into first and second portions in axial succession provided with means for connecting said portions in leakproof and releasable manner respectively to the end of the tubular body and to the pipe, and a removable abutment ring provided with means for locking it axially on the pipe and set back from the end thereof to constitute an abutment shoulder when the pipe is engaged in the tubular body, and an axial abutment shoulder between the second portion of the sleeve and the pipe.

By means of this disposition of a removable abutment ring, pipes or members in a pressurized fluid circuit can be dismantled more easily. It suffices to disconnect one or both of the sleeves of the corresponding tubular bodies to uncover the abutment rings and thus to gain access thereto in order to release them from the pipes on which they are installed. There is then no longer any obstacle to relative sliding between the components of the connection, thus providing greater freedom to move these components relative to one another in order to engage them and to disengage them.

In a particular embodiment, the abutment ring is radially expansible and has a protecting inside surface from which there extends at least one stud for locking it axially on the pipe, the stud being designed to be received in a housing formed in corresponding manner in the wall of the pipe. The abutment ring is easily locked on the tube and is also easily released therefrom.

Preferably, the abutment ring comprises two half-rings united by an elastic band received in a peripheral groove in the half-rings. As a result, the two half-rings can be moved apart from each other in resilient manner, thereby enabling the abutment ring to be put into place on the pipe and enabling the abutment ring to be moved, thereby disengaging the stud from the housing.

BRIEF DESCRIPTION OF THE DRAWINGS

Other characteristics and advantages of the invention will appear on reading the following description of a non-limiting particular embodiment of the invention.

Reference is made to the accompanying drawings, in which:

FIG. 3 is a perspective view of an abutment ring of a connection device of the invention.

MORE DETAILED DESCRIPTION

Figure 1:
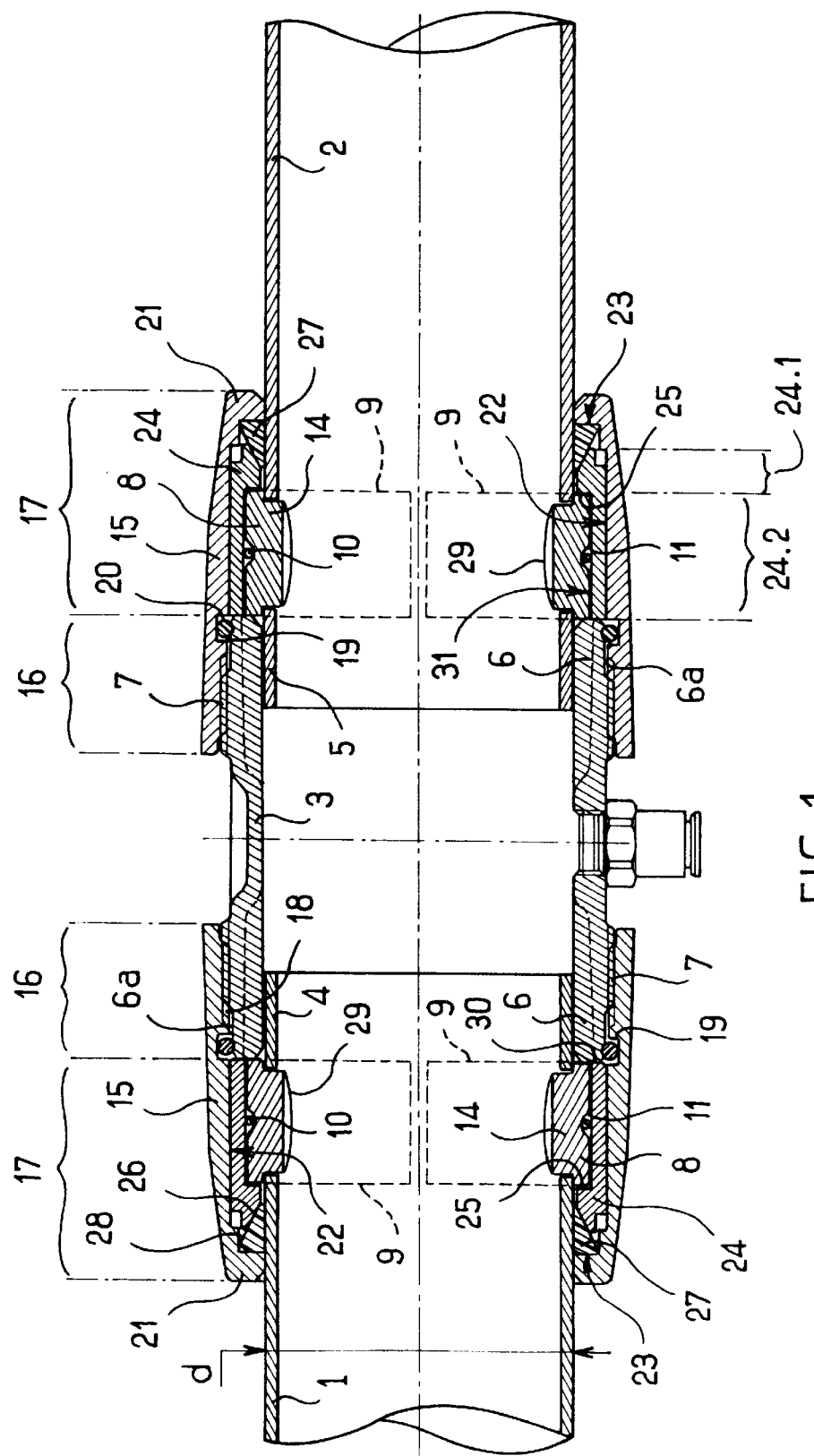
FIG. 1 is a longitudinal section view of the coupling between two pipes by means of a connection device of the invention.

The invention as described below is more particularly adapted to coupling together two pipes 1 and 2 by means of a tubular body given overall reference 3 and forming a union in which respective end portions 4 and 5 of each of the pipes 1 and 2 are engaged. Naturally, the invention is also applicable to coupling a pipe to a functional member such as a filter, an expander, a valve, or a distributor, with the tubular body then constituting an endpiece secured to the member.

With reference to the figures, the union-forming tubular body 3 possesses two opposite ends 6 into which the end portions 4 and 5 of the pipes 1 and 2 are inserted. Each end 6 of the tubular body 3 has an outside thread 7. The tubular body 3 also has a purge orifice on its side which is closed by a stopper. Instead of having a purge orifice, the tubular body 3 could, for example, include a transverse T-connection for a branch duct.

The connection device of the invention also comprises an abutment ring given overall reference 8 and made up of two half-rings 9 which are united by an elastic band 10. The half-rings 9 are made of metal or of a rigid thermoplastic material. The elastic band 10 is made of elastomer and is received in a peripheral groove 11 formed in the outside surface 12 of each half-ring 9 so that the elastic band 10 projects slightly from the outside surface 12. Each half-ring 9 has a projecting inside surface from which there projects a respective stud 14. When the elastic band 10 is in a rest state, the inside diameter of the abutment ring 8 level with the inside surface 13 is substantially equal to the outside diameter d of the corresponding pipe 1 or 2 or slightly smaller than said diameter. Since the band 10 is elastic, the studs 14 can be moved apart from each other so as to enable the ring 8 to be slid over the pipe 1,2.

For each end 6 of the tubular body 3, the connection device further comprises a sleeve given overall reference 15 and subdivided into two axially successive portions 16 and 17, having means for securing them in leakproof and releasable manner respectively with one end 6 of the tubular body 3 and with the corresponding pipe received in the tubular body 3.

The portion 16 of each sleeve 15 thus has tapping 18 towards its free end for co-operating with the thread 7 of the tubular body 3, and a groove 19 adjacent to the portion 17 to receive an O-ring 20 which projects slightly from the groove 19.

The portion 17 of each sleeve 15 has a free end 21 defining an opening of diameter substantially equal to the outside diameter of the pipe and a housing 22 of diameter greater than chat of the opening which is connected thereto via a shoulder 23 and which extends in the opposite direction as far as the groove 19.

The housing 22 slidably receives a piston 24 having a section 24.1 adjacent to the end 21 having an inside diameter substantially equal to the outside diameter of the pipe, and a section 24.2 defining an axially-open chamber which is terminated adjacent to the section 24.1 by a radial face 25 facing towards the ring 8 and which an inside diameter substantially equal to the outside diameter of the abutment ring 8 when it is fitted to the pipe. The free end 26 of the section 24.1 is of conical inside shape, flaring away from the section 24.2. This free end 26 cooperates with the shoulder 23 of the sleeve 15 to define an annular housing of variable volume.

An annular sealing element 27 of elastomer is disposed in the variable volume housing. The annular sealing element 27 is elastically deformable, and at rest its inside diameter is substantially equal to or slightly greater than the outside diameter of the pipe, and it possesses a chamfered end 28 extending adjacent to the free end 26 of the piston 24.

Prior to coupling the two pipe segments 1 and 2, both a sleeve 15 (fitted with the piston 24 and the gaskets 20 and 27) and an abutment ring 8 are engaged in succession on the end portion 4, 5 of the corresponding pipe 1, 2 in such a manner that the studs 14 are received in housings 29 formed in the wall of the pipe 1, 2 in the vicinity of its end. In this case, the housings in question are through holes, but they could equally well be indentations.

The end portions 4, 5 of the pipes 1, 2 are then inserted in succession into the tubular body 3 until the abutment rings 8 come to bear against the ends 6 thereof. The sleeves 15 are then brought onto the ends 6 of the tubular body 3 and the portions 16 thereof are screwed onto the threads 7. The abutment rings 8 are then received in the chambers of the sections 24.2 of the pistons 24.

While each sleeve 15 is being tightened onto the tubular body 3, the free end 30 of the section 24.2 of the piston 24 of each sleeve 15 comes into abutment against the corresponding end 6 of the tubular body 3 and/or the radial face 25 of the piston chamber comes into abutment against the abutment ring 8, thereby causing the piston 24 to slide in the housing 22 which compresses the annular sealing element 27 and urges it against the outside surface of the corresponding pipe by the co-operation between the conical outer and inner surfaces at the ends 28 and 26 thereof. The coupling is sealed by the gasket 20 bearing against a bearing surface 6a at the end 6 of the tubular body 3 that is situated in front of the thread 7 by means of the elastic band 10 pressed against the inner cylindrical surface 31 of the chamber in the section 24.2 of the piston 24, and by the annular sealing element 27 compressed between the free end 26 of the section 24.1 of the piston 24, the shoulder 23 of the sleeve 15, and the outside surface of the corresponding pipe.

The pipes 1 and 2 are disconnected by unscrewing the sleeves 15 mounted on the tubular body 3 in which the ends 4 and 5 of the pipes have been inserted. It will be observed that if the circuit is still under pressure, leakage then occurs via the annular sealing element 27 as soon as the sleeve 15 begins to be unscrewed, hereby warning the operator.

Once the sleeves 15 have been unscrewed, the abutment ring 8 mounted on the end 4 of the pipe 1 is moved away from the corresponding tubular body 3 by moving the half-rings 9 apart so as to disengage the studs 14 from the housings 29 and by causing the studs to slide along the corresponding pipe. The tubular body 3 can then be moved along the pipe 1 sufficiently to enable the end 5 of the pipe 2 to be released.

Figure 2:
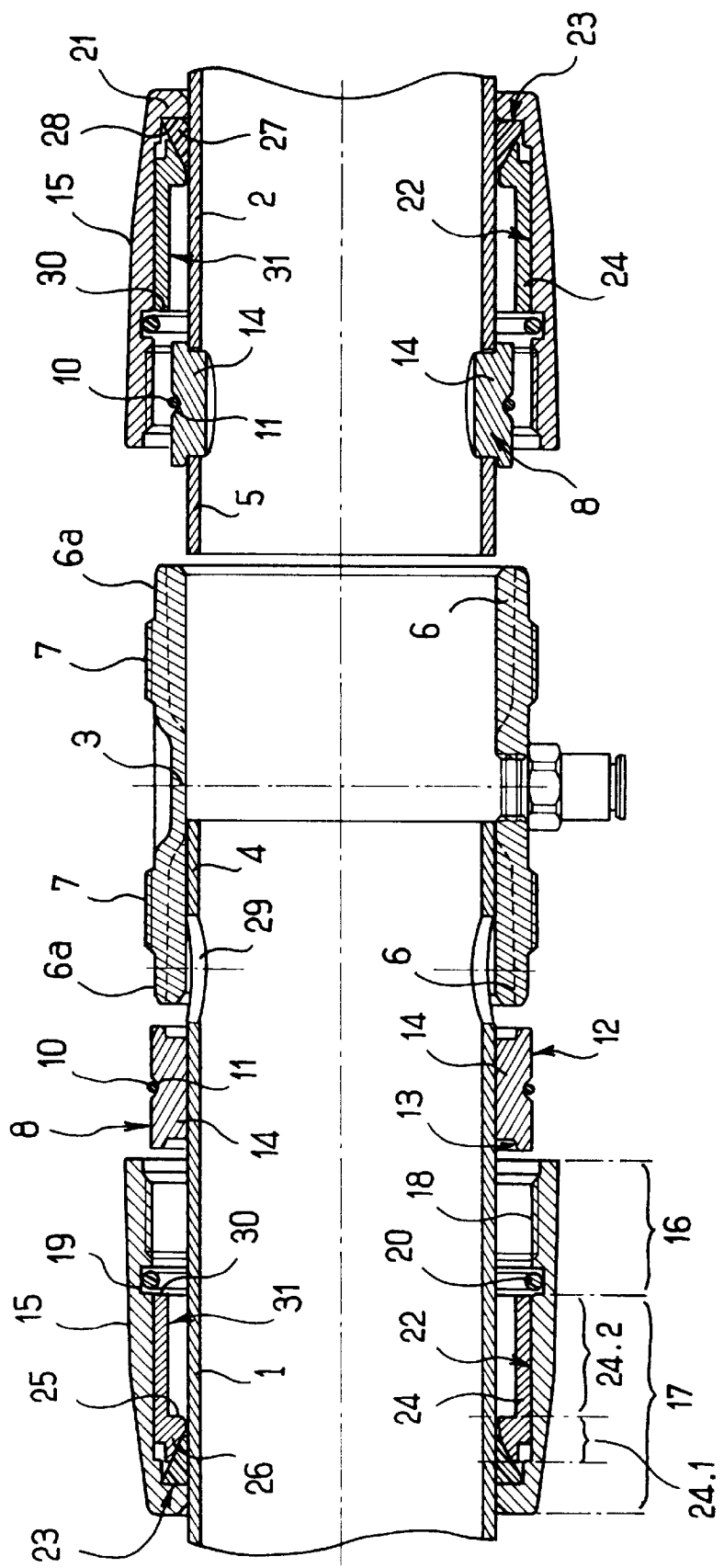
FIG. 2 is a view analogous to FIG. 1 showing the connection device while one of the two pipes is being disconnected.

FIG. 2 shows this disconnection state which can be achieved in the same manner at the other end of the pipe 2, thereby enabling the pipe 2 to be removed sideways from the circuit. It will be observed that if the pipe is sufficiently flexible, then its other end can be disconnected merely by unscrewing the sleeve which connects it to the corresponding body, after which it can be extracted axially from the body by bending.

It will be observed that if the circuit is under pressure while the sleeves 15 are being unscrewed, the tubular body 3 is held in position on the ends of the pipe by the abutment rings 8, thereby ensuring that there is no sudden uncontrolled and therefore dangerous movement of the components of the connection.

It will also be observed that the gasket 20 serves to hold the piston 24 in the housing 22 when the sleeve 15 is removed.

Naturally, the invention is not limited to the embodiment described and variants can be applied thereto without going beyond the ambit of the invention as defined by the claims.

In particular, it would not go beyond the ambit of the invention to replace the threaded connection between the sleeve 15 and the tubular body 3 by some other connection, e.g. an interference fit held by external clamping between the abutment ring 8 and a collar included in corresponding manner at the end 6 of the tubular body 3.

In addition, the sleeve can be designed as a single piece without the piston 24.

Finally, the abutment ring 8 can have any suitable means for enabling it to be locked axially in position on the pipe in releasable manner instead of using studs (e.g. clamping means). The abutment ring 8 can also be made as a single piece having elastically deformable portions, or having retractable studs.

Furthermore, the elastic band 10 is optional, and the half-rings could be held merely by the inside surface of the housing formed in the sleeve.

What is claimed is:

1. Connection means for connecting a pipe to a tubular body having an end arranged to receive one end of the pipe, the connection means comprising a sleeve subdivided into first and second portions in axial succession provided with means for connecting said portions in leakproof and releasable manner respectively to the end of the tubular body and to the pipe, wherein the connection means comprises a removable abutment ring provided with means for locking it axially on the pipe set back for the end there of to constitute an abutment shoulder bearing against the tubular body when the pipe is engaged in the tubular body and an axial abutment shoulder between the second portion of the sleeve and the pipe.

2. Connection means according to claim 1, wherein the abutment ring is radially expansible and has a projecting inside surface from which there extends at least one stud for locking it axially on the pipe, the stud being designed to be received in a housing formed in corresponding manner in the wall of the pipe.

3. Connection means according to claim 2, wherein the abutment ring comprises two half-rings united by an elastic band received in a peripheral groove formed in the outside surface of the half-rings.

4. Connection means according to claim 1, including an annular piston slidably mounted in tne second portion of the sleeve and presenting a radial face directed towards the ring and an end opposite from this face which co-operates with an internal shoulder of the second portion of the sleeve to define an annular housing of variable volume for a deformable annular gasket.

5. Connection means according to claim 4, wherein the piston presents a cylindrical chamber in which the abutment ring is at least partially received when the connection is made.

6. Connection means according to claim 5, wherein the elastic band of the abutment ring projects from the outside surface thereof so as to come into contact with the inside cylindrical surface of the chamber.

7. Connection means according to claim 1, wherein the first portion of the sleeve includes an annular sealing gasket received in a groove thereof and designed to co-operate with an outside cylindrical surface of the tubular body.

* * * * *